Feb. 7, 1956 H. L. TWINING 2,733,595
PORTABLE TESTING APPARATUS FOR DRILLING-MUD ADDITIVES
Filed March 5, 1953 3 Sheets-Sheet 1

Homer L. Twining
INVENTOR.

BY Clarence A. O'Brien
and Harvey B. Jacobson
Attorneys

Feb. 7, 1956          H. L. TWINING          2,733,595
PORTABLE TESTING APPARATUS FOR DRILLING-MUD ADDITIVES
Filed March 5, 1953          3 Sheets-Sheet 2
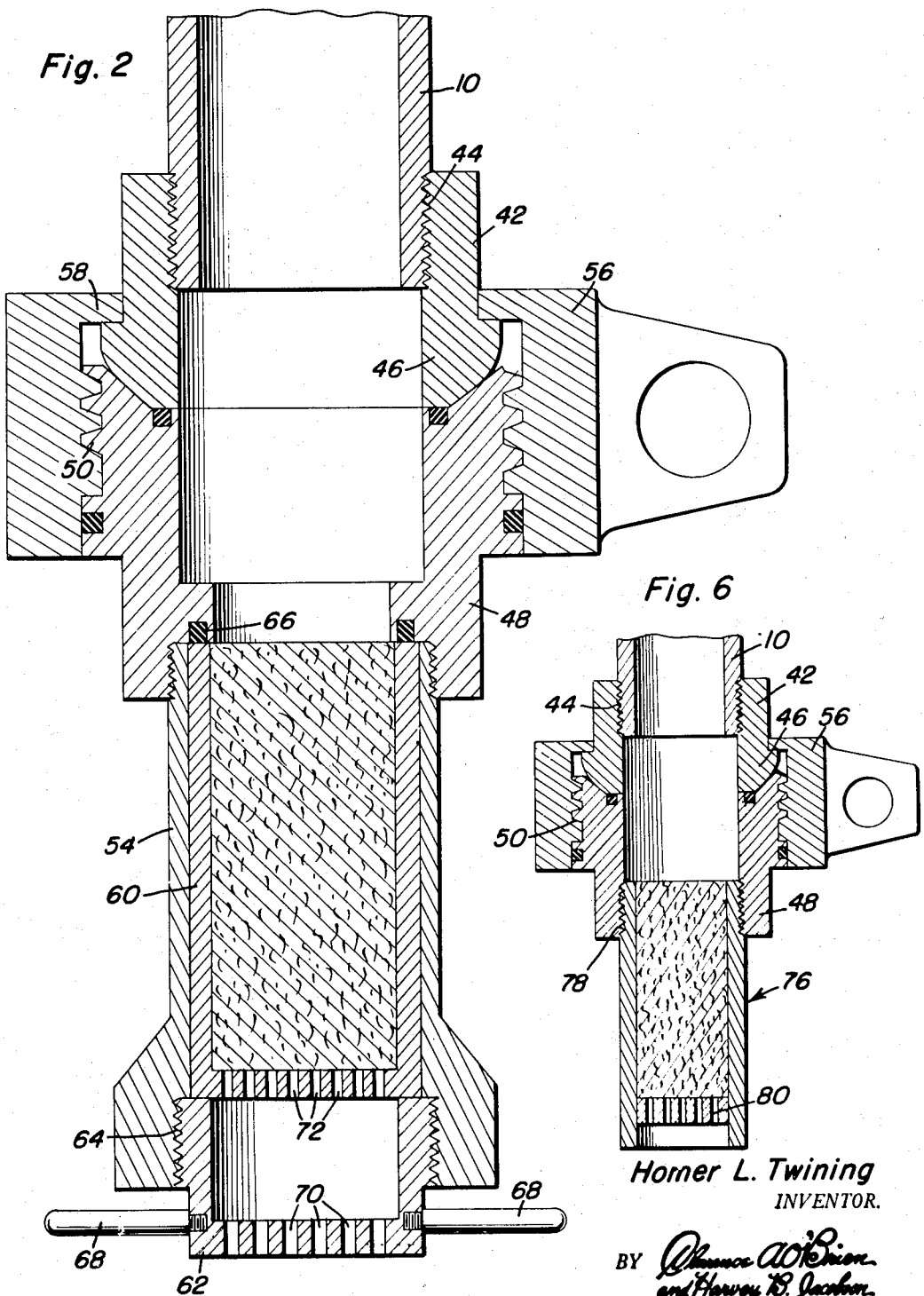
Homer L. Twining
INVENTOR.

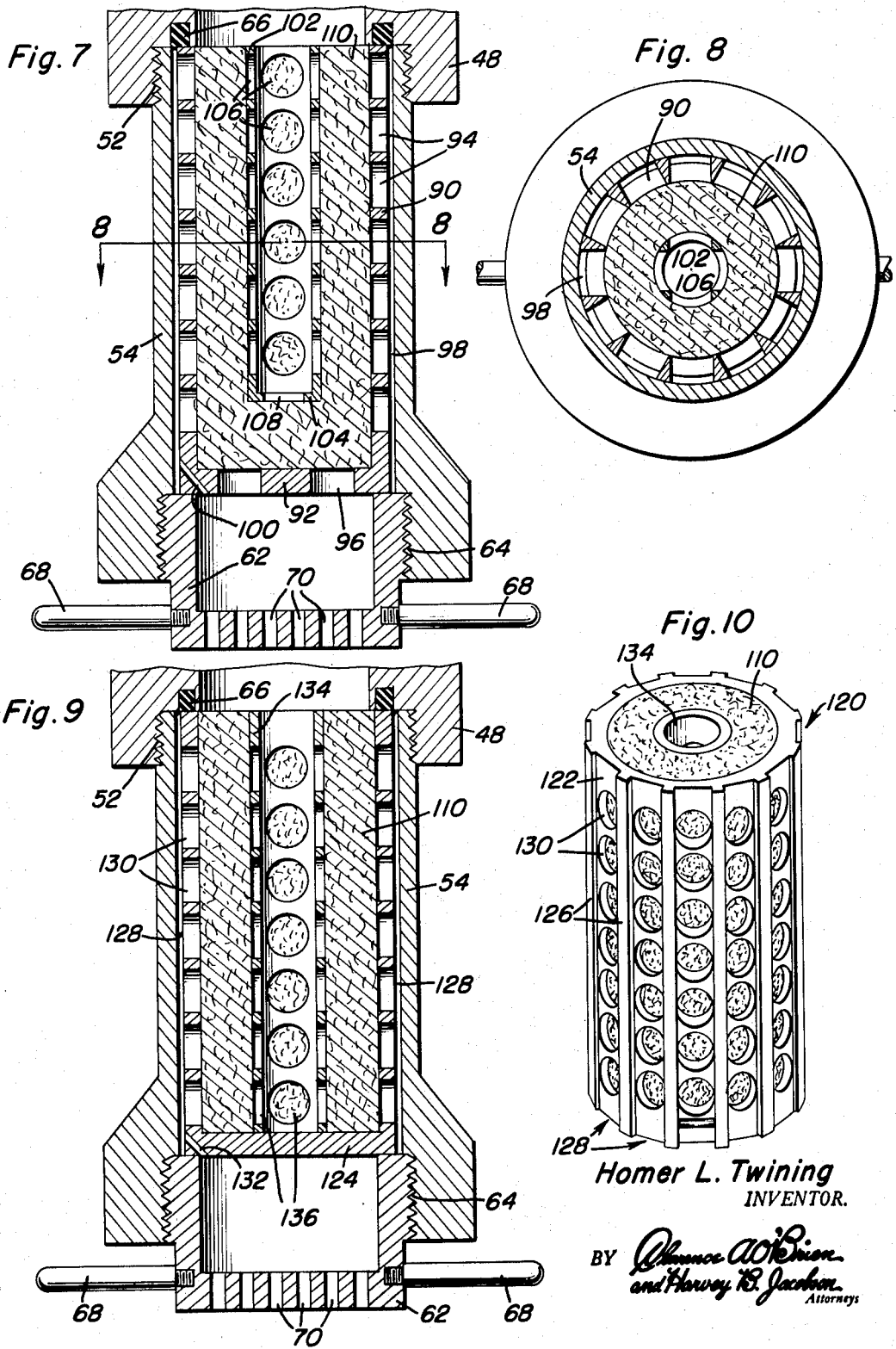

2,733,595

PORTABLE TESTING APPARATUS FOR DRILLING-MUD ADDITIVES

Homer L. Twining, San Antonio, Tex.

Application March 5, 1953, Serial No. 340,641

14 Claims. (Cl. 73—38)

This invention comprises novel and useful improvements in a portable testing apparatus for drilling mud additives and constitutes an improvement over and is a continuation in part of my co-pending application Serial Number 264,806, filed January 3, 1952, for Testing Apparatus, and now abandoned.

More specifically, the present invention relates to a testing apparatus for qualitatively and comparatively determining the ability of various materials to seal and prevent loss of drilling fluids and drilling muds into permeable formations when the fluids and muds are subjected to pressures simulating actual drilling well conditions.

The control and prevention of lost circulation of drilling fluids is a problem frequently encountered during the drilling of oil, gas, and other wells. A large number of lost circulation materials, also known as drilling mud additives, have been produced, and the same may be purchased as additives to be compounded with the drilling fluids for the purpose of sealing off cavities, fissures, and similar permeable formations encountered in the drilling of the well. Not to be confused with lost circulation is the continuous reduction in mud volume caused by the loss of the fluid phase of muds as filtrates, and loss of the solid phase as filter cake during the continuous filtration process which occurs through permeable formation surfaces.

The lost circulation materials now available can be classified according to their physical properties and it will be found that they fall into one of the following classifications. Fibrous additives, which are flexible and tend to mat by intermeshing with each other, and which are forced within the interstices of the permeable formation by the hydrostatic pressure of the drilling fluid. Granular additives, which have some rigidity and thus tend to plug the openings that are smaller in size than the particular granular particles. Laminated additives, which essentially comprise thin layer-like particles, such as scales, flakes, and the like, and which build up by being deposited layer upon layer, and dehydratable materials such as the under water setting cements.

Lost circulation materials, especially when used in the quantities required to seal deep well bores are expensive. A material suitable for treating one type of porous formation, may be entirely unsuitable for efficiently sealing another type. It is therefore of the utmost importance to be able to determine the exact performance which may be expected of a given material in a given formation and under a particular set of conditions; and to know the comparative performances of different materials under the same conditions.

Heretofore, tests conducted were apparently giving results not in conformity with the results obtained by actual usage. After extensive investigation, I have discovered that the inconsistencies and inaccuracies of the tests arose from the fact that the test apparatuses could not sufficiently closely simulate the formation structure and the operating pressures encountered in actual practice. It was found that comparative tests conducted on different materials at a few hundred pounds gave radically different results from tests conducted under the same condition and at pressures at from 1000 to 2000 pounds. It therefore is a fundamental purpose of this invention to provide a testing apparatus which will enable tests to be conducted under conditions which will very closely approximate the conditions of an actual well bore as to the various operating pressures and formation structure.

Moreover, it is desirable for the well driller to be able to make tests quickly and at the well location, in order to select the best material for his particular problem, and determine the proper quantity and proportion required with a minimum loss of time. For this purpose the testing apparatus must be readily portable.

A general object of the invention is to provide a novel testing device for determining the behavior characteristics, comparatively evaluating and testing the ability of materials to function as sealing agents and prevent loss of the drilling fluids into various types of permeable formations such as may be encountered in the drilling of an oil or gas well.

A more specific object of the invention resides in the provision of a testing device which will subject sealing materials to pressure such as encountered in actual drilling operations so that the ability of the materials to seal and prevent loss of the drilling fluid and drilling mud can be readily and accurately ascertained and can be qualitatively compared.

A further object is to provide a portable testing device for the purpose described which will incorporate a plastic container or cup and which is removable from the device following the test in order to visually appraise the performance characteristics of the particular additive tested.

A further object is to provide a device of the character described which will be simple in construction, embodying relatively few parts and which can be economically manufactured.

Another very important object of this invention is to provide a testing apparatus which will enable the testing of the sealing qualities of drilling fluid additives against vertical surfaces, horizontal surfaces or both in a testing bed simulating a permeable formation.

Yet another important object of this invention is to provide a testing apparatus for the sealing properties of lost circulation materials which will enable the ready establishment or formation of test beds simulating various types of permeable formations; and will facilitate the establishing of test surfaces upon or within the beds in various positions.

More specifically, it is an important object of this invention to provide a testing apparatus which will enable the operator to readily determine the comparative sealing properties of various mud additives upon vertical surfaces, horizontal surfaces or both.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a fragmentary vertical sectional view, taken upon an enlarged scale through the lower portion of the testing tube and illustrating the releasable coupling, and the removable plastic container for this end of the testing tube;

Figure 6 is a fragmentary sectional view through the lower depending end of the testing tube and illustrating a modified form of container and structure for releasably securing the same to the testing tube;

Figure 7 is a fragmentary vertical sectional view illustrating a modified form of testing chamber and removable testing bed and container therefor associated therewith;

Figure 8 is a horizontal sectional view taken substantially upon the plane indicated by the section line 8—8 of Figure 7;

Figure 9 is a view similar to Figure 7 and showing a still further modified form of the testing chamber of the apparatus; and Figure 10 is a perspective view of the removable testing bed and container therefor forming a part of the apparatus of Figure 9.

Figure 1:
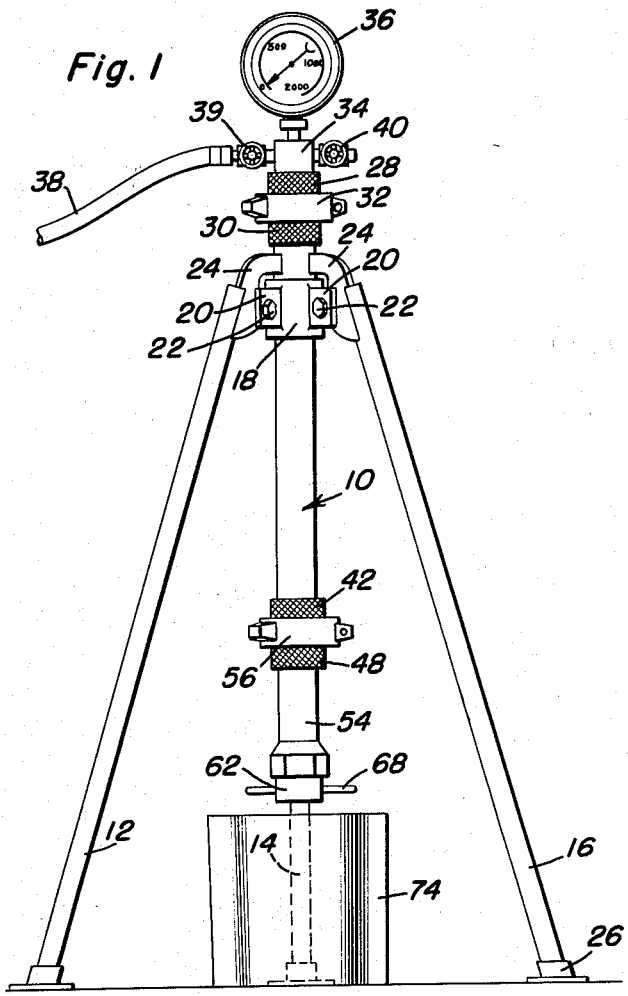
Figure 1 is a front elevational view of a portable testing device in accordance with this invention, with all of the parts in assembled relation ready for operation.
Figure 3:
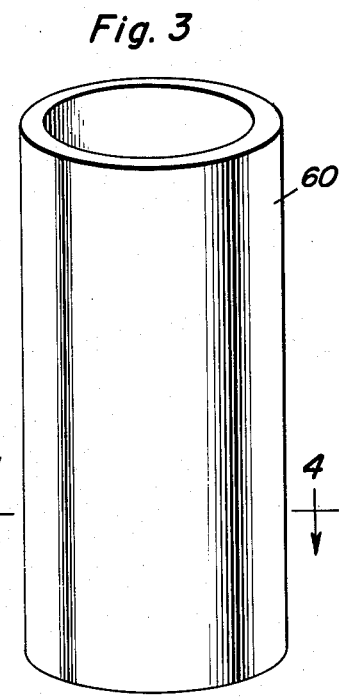
Figure 3 is a perspective view of the plastic container.
Figure 5:
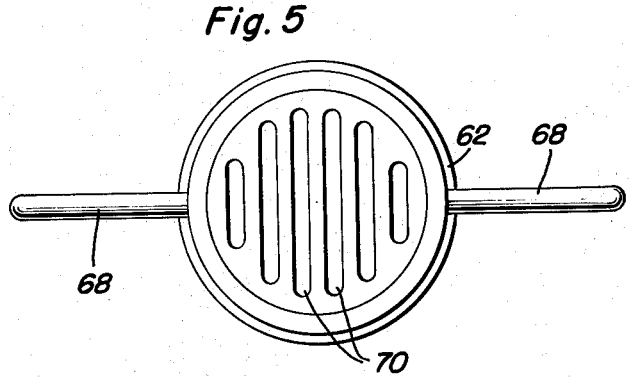
Figure 5 is a bottom plan view of the retaining plug for the container, the container and plug being shown in assembled relation in Figure 2.
Figure 4:
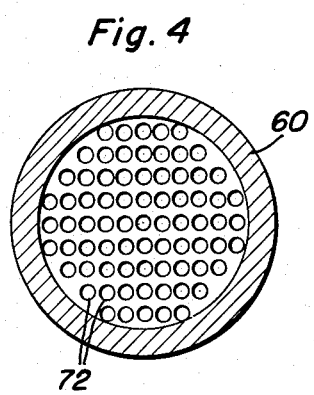
Figure 4 is a transverse horizontal sectional taken substantially upon the plane indicated by the section line 4—4 of Figure 3.

In order to more clearly set forth the fundamental principles of the invention, reference is made first to the modification of apparatus disclosed in Figures 1–5 and in the modified form of Figure 6, these two embodiments each providing a cylindrical testing chamber having imperforate side walls together with a perforated bottom wall by which the circulating mud containing the additive or low circulation material to be tested may pass from the bottom of the testing chamber. In the forms of the apparatus disclosed in Figures 7–10, and which in some instances are considered to be the preferred forms of the apparatus, the testing chamber is provided with perforations upon the side walls or upon the side and bottom walls.

*Modification of Figures 1–5*

The testing device of this invention has been especially designed for testing fibrous, granular, and laminated materials, or combinations of the same, to comparatively and qualitatively evaluate their ability to plug fissures, cavities, and similar permeable formations when combined with drilling fluids or muds and subjected to pressures such as produced in actual drilling well operations. Accordingly, the device is portable in order that the same may be easily assembled or disassembled, transported and operated to perform tests at various places and even on location at the well, should the same be desired.

The device essentially consists of an elongated testing tube indicated generally by the numeral 10, which is suitably supported at its upper end so as to depend substantially centrally of a supporting structure consisting of a plurality of collapsible standards 12, 14, and 16. In the vicinity of its upper end, the testing tube 10 is suitably provided with a collar 18, fixedly secured to the tubing and having at least three radially projecting bifurcated hinges 20. The standards 12, 14, and 16, are pivotally secured to the hinge members 20 by means of pivot pins 22 for which purpose the standards at their upper ends are formed or provided with apertured plate-like members disposed within the bifurcated hinges 20. Said members are characterized by substantially horizontal, inwardly projecting terminal ends 24 which contact the testing tube to limit outward movement of the collapsible standards 12, 14, and 16. It is desirable to provide each standard with a ground engaging member 26 to insure proper support for the device when the standards are in expanded operative position. The above features are important in that they enable the apparatus to be quickly set up at any well location.

Testing tube 10 projects above the collar 18 and the tube is filled with drilling fluid from this top end of the tube. It is necessary, of course, to close the top end of the tube in order to subject the drilling fluid to pressure, for which purpose the top end of the tube is provided with a conventional coupling union including members 28 and 30 and securing nut 32. The coupling union is similar to the union employed at the depending end of the tube illustrated in Figure 2, and which will hereinafter be described in detail. It is only necessary to understand that by the rotation of nut 32 in one direction members 28 and 30 and pipe section threaded thereto are securely coupled to form a sealed liquid tight joint. By rotation of nut 32 in a reverse direction, member 28 can be detached from 30 whereby the top of the testing tube is open for receiving the drilling fluid to be tested. Cap section 34 of dome-shape, is suitably threaded to member 28 and said section is provided with a pressure gage 36, a supply pipe 38 having a manually operated control valve 39 for supplying a gas, including air, of the desired pressure to the testing tube, and with the valved outlet pipe 40, by means of which the testing tube can be vented to the atmosphere following a testing operation. The control valves 39 and 40 permit the interior of the testing apparatus to be closed to the atmosphere and to the source of pressure. Thus the pressure imposed upon a sample undergoing testing may be maintained, enabling an insufficient source of pressure for the line 38, as a cylinder of compressed gas which is wholly or partially exhausted, to be replaced by an adequate source of pressure without interfering with resumption and completion of the test. Further, the closing of both valves 39 and 40 enable tests to be made to determine the completeness and the longevity of the sealing action of the materials being tested.

A similar coupling is provided at the lower end of the depending testing tube 10, as best illustrated in Figure 2. The purpose of the second coupling is to provide for releasable connection with the testing tube of a cylinder for receiving the steel or plastic container or cup, the purpose of which will be later understood as the description proceeds. The testing tube 10 is threadedly connected with a member 42 by the threads 44, the member 42 terminating in a hub section such as 46. The member 48, adapted to be coupled to 42, has a top hub section which is externally threaded as at 50. The base of member 48 is interiorly threaded as at 52 by means of which the cylinder 54 is threadedly secured to coupling member 48. The nut 56 is provided with the over-hanging lip 58 for contacting the hub 46 whereby to retain member 42 in assembled relation with the nut. Also the nut is in interiorly threaded engagement with threads 50 on member 48 and it will be understood that when the nut is rotated in one direction, the coupling members 42 and 48 are drawn together and securely held in coupled relation.

Rotation of the nut in a reverse direction will release member 48 so that said coupling member and cylinder 54 threaded thereto can be removed from the testing tube 10. The cylinder 54 is cored internally in a manner to provide smooth machined surfaces of the exact diameter for receiving the plastic cup 60 which is insertable in the cylinder 54 from the open bottom end. With the plastic cup in place within the cylinder, the open bottom end of the cylinder is closed by the retaining plug indicated in its entirety by the numeral 62. For receiving the plug 62, the interior wall of the cylinder 54 adjacent the bottom end thereof is threaded as at 64 and it will be seen that the plug can be threaded into the cylinder to an extent where it contacts the plastic cup, securely locking the same within the cylinder with its circular top surface in sealing contact with the packing material or packing ring 66 to prevent leakage of the drilling fluid at this top joint. To facilitate turning of the retaining plug, the same is provided with outwardly projecting fingers or rods 68 and the bottom wall of the retaining plug is conveniently perforated by the elongated openings 70 formed therein. The openings allow drainage of any drilling fluid that may pass through the plastic cup.

The cup 60 may be formed of any suitable material including metals, a transparent plastic being preferred, since it permits a visual inspection of the performance characteristics of the drilling fluid additives following a test. The cup has a perforated bottom as a result of the small openings 72 provided in the bottom wall of the same. Also, the outside diameter of the cup is such as to have a close sliding fit within the bore provided therefor in the cylinder. A hard durable plastic is preferred for the material of the cup and the walls of the same are made sufficiently thick to give adequate strength and durability so the same will withstand the high pressures to which it is subjected (may be equal or exceed 2000 pounds per square inch) during a testing operation.

Before operation of the present testing device, the plastic cup is removed and the same is filled with stone or gravel of a selected size or sizes and shapes to form voids and thereby simulate various selected permeable formations such as may be encountered during drilling of an oil or gas well. The cup is then replaced within the cylinder 54 and the retaining plug 62 is inserted to lock the cup in place. The cap section 34 is then removed from testing tube 10, whereby the top of the tube is open for receiving the drilling fluid having had mixed therewith the particular sealing materials selected for the test.

A measured quantity of the drilling fluid is employed for each test, generally on the order of two thousand centimeters. The cap 34 is then replaced and by manipulation of nut 32, the parts are securely coupled together to form a liquid and airtight seal. The test is then conducted by admitting air or gas under pressure from any suitable source, such as from pressure cylinders to the supply pipe 38 and past the open control valve 39 to the testing tube and the particular pressure developed within the testing tube above the drilling fluid can be read from the pressure gage 36.

The action of the pressure on the drilling fluid is to force the same into the plastic cup and in so doing, the additives contained in the drilling fluid are forced into the voids and cavities provided by the gravel within the cup. During the initial stages of the test, some drilling fluid will pass completely through the plastic cup to drain from openings 72 thereof and this drilling fluid will in turn drain from openings 70 so that the same can be collected by the operator, as for example in a collection bucket or receptacles 74 disposed beneath the opening 70, for measuring and for re-use.

Depending on the sealing and plugging characteristics of the particular additive undergoing test, the drainage of drilling fluid may be continued or the voids and cavities provided by the gravel within the cup may be effectively plugged and sealed to thereby stop any further flow and leakage of the drilling fluid. In order that comparative results may be obtained, the quantity of drilling fluid draining from the retaining plug should be recovered and accurately measured and upon completion of the test, the plastic cup 60 can be removed in order for the operator to visually appraise the performance characteristics of the additive, such as the extent of penetration of the additive into the voids, the character and conformation of the penetrating material and its ability to seal and plug and the thickness of any filter cake that may be produced, the quantity of material lost before a seal was established and the like.

In actual test performed by the device, certain additives failed completely under high pressures so that the entire measured quantity of drilling fluid contained within the testing tube 10 drained from openings 70. On removal of the plastic cup, and an inspection of the same, it was found that most of the voids were still open and little or no sealing was effectuated by the drilling fluid additive undergoing test. On the other hand, other additives have shown remarkable ability to seal under high pressures and to thus prevent drainage of the drilling fluid from the plastic cup. Here also, upon removal of the cup, it was possible for the operator to gain valuable information in respect to the performance characteristics of the additive. Moreover, by watching the pressure gage 36 during the application of pressure to the device, the pressure at which a seal is first established, the pressure at which the seal is broken, and the behavior of the seal in adjusting itself in the interstices of the gravel test under increasing pressures can be readily established as well as the comparative performance of different materials.

In conducting tests with this apparatus, it was found that after pressures of several hundred pounds were reached, that the gravels of test beds sometimes shifted and readjusted under the pressures. This movement invariably broke or dislodged any seal previously established. Since such movement within the test bed corresponds to movements and shifting within an actual formation encountered in well drilling operations, it will be apparent that the present invention provides a further simulation of conditions within a well bore and enables the obtaining of test data upon the performance of lost circulation materials in establishing, maintaining and reestablishing broken seals in such formations.

It is believed that some of the above mentioned misleading results of prior test apparatuses may be attributed to the failure of such apparatus to secure test pressures of sufficient magnitude to cause the movement or slippage within the test bed and therefore such apparatuses did not give any indications of the characteristics of the material undergoing test to maintain or reestablish seals in a shifting type of formation.

Modified Embodiment of Figure 6

In the modified form of Figure 6, the cylinder 54 has been eliminated and the cup, either plastic or metal, and generally designated by the numeral 76 is threaded directly to the member 48. Accordingly, this modification eliminates not only the metal cylinder 54 but also the retaining plug 62. The cup 76 is exteriorly threaded at its upper end as at 78 for securing the cup to member 48. The cup is provided with an interior bottom wall 80 which is perforated as a result of small openings formed therein.

The operation of the modified testing device shown in Figure 6 is substantially the same as that described for the previous modification. However, instead of removing the cup from cylinder 54 as described in connection with Figures 1 and 2, it is necessary with the modification of Figure 6, to release member 48 by manipulation of nut 56. For comparing results, it may be desirable to employ a new cup threaded to said member in its place.

The portable device of the invention essentially consists of a special filter press designed for the purpose of determining the value of various drilling fluid additives as lost circulation materials. The top pressure of about two thousand pounds per square inch will be found entirely adequate for most tests and accordingly, the pressure gage shown in Figure 1, has been so calibrated. Also, the plastic cup or container has been shown as containing conventional filter material. Actually, the filter material for the cup may vary from sand to very coarse gravel or stone, depending on the particular test being conducted by the operator. Accordingly, with the pressure and filter media being variable, the testing device can be made to simulate bottom hole conditions of wells of any and all types.

Modified Apparatus of Figures 7 and 8

It will be noted that in the embodiment of Figures 1 and 6, the drilling fluid containing the lost circulation material admixed therewith was permitted to pass through a test bed from the top to the bottom thereof only, so that the sealing effect of the lost circulation material was utilized solely upon the horizontal surface of the test bed. In the embodiment of Figures 7 and 9, the basic principles of this apparatus are extended to include the testing of the sealing properties of the drilling mud additives upon vertical or inclined surfaces alone or in combination with horizontal surfaces of the testing bed.

For the above purposes, exactly the same form of testing apparatus, previously described may be employed, except that the cup 60 previously disclosed is replaced by a modified form of cup or receptacle of a construction to be now described.

The other parts of the apparatus which are identical with that previously described, have been designated by the same numerals throughout Figures 7–10.

As a replacement for the cup 60 or 76, previously described, there is provided a cup or container 90 preferably of a cylindrical shape and having an open upper end which is adapted to be pressed against and into fluid tight sealing engagement with packing member 66 previously mentioned, together with a bottom wall 92 which is adapted to be engaged by the upper end of the retaining plug 62 for clamping the cup 90 into the cylinder 54. The cup 90 is apertured or slotted upon its cylindrical side wall as at 94 and upon its bottom wall 92 as at 96 to provide drainage openings from the vertical sides and horizontal bottom surfaces of the cup.

It is to be particularly noted that an annular space indicated by the numeral 98 is provided between the exterior surface of the cylindrical cup 90 and the cylindrical interior surface of the cylinder 54, between the sealing member 66 and the upper end of the retaining plug 62. This annular space receives fluid draining through the sides of the cup 90, from the apertures 94 therein, and the fluid so draining from the cup is then discharged through suitable passages 100 from the space 98 into the interior of the drain plug 62, and is then discharged from the aperture 70 in the bottom thereof in the same manner as set forth in connection with the apparatus of Figure 2.

Illustrated in Figure 7 is an inner cylinder 102 which is provided with an open top and a bottom wall 104. The inner cylinder has its cylindrical side wall provided with apertures 106 and the bottom wall 104 is likewise apertured as at 108. The inner cylinder is disposed axially of the cup 90 with its bottom wall 104 spaced above the bottom wall 92 and with its open upper end opening into the interior of the member 48.

Designated generally by the numeral 110 is a test bed consisting of gravel, sand, or the like, and of a sufficient particle size and composition to closely simulate a selected permeable formation upon which it is desired to test the sealing properties of a particular lost circulation material. As illustrated in Figure 7, it will be seen that the perforated inner cylinder 102 is surrounded upon its cylindrical vertical side walls and is provided beneath its bottom wall 104 with a mass of the material 110 simulating the side wall and bottom wall of a well bore through a permeable formation. The cylinder is relied upon to maintain a cylindrical cavity simulating a well bore in the test bed 110.

In some instances, the inner cylinder 102 may be supported in the desired relative position within the cup 90 as by supporting legs extending from the side or bottom wall of the inner cylinder and engaging the adjacent side or bottom wall of the cup 90. In other instances, the inner cylinder may be integrally secured to the cup 90 in the desired relation therein. Still further, the inner cylinder can be removably placed within the cup after the test bed 110 has been filled to the desired level within the cup which corresponds to that of the bottom wall of the inner cylinder, and after the inner cylinder is then placed in position, the test bed may be filled in to substantially the top of the inner and outer members 102 and 90.

It is intended that the open upper end of the cylinder shall lie at least as high as the top surface of the test bed 110 so that after the cylinder and test bed are properly positioned relative to each other and to the cup 90, the drilling fluid having the lost circulation material admixed therewith may be introduced into the test device in the manner described in connection with Figures 1 and 2, so that the drilling fluid with the additive therein will contact the vertical side walls as well as the bottom walls of the central cavity formed within and maintained within test bed 110. The operation of this form of the device is the same as that previously described.

Moreover, in some instances, if the character and cohesiveness of the test bed will admit, the cylinder 102 may be withdrawn after the test bed is completed, leaving a cylindrical bore in the test bed. To facilitate this operation, the test bed may be tamped to increase its firmness.

In the embodiment of the Figures 7 and 8, the cup 90 may be constructed of any desired material having the necessary strength to withstand the pressures employed during the operation of the testing apparatus, the primary function of the cup being to maintain the testing bed 110 in the desired shape and condition by maintaining a bore in the test bed having vertical walls for undergoing the testing operation. It will be observed that in this form of the apparatus, the performance of the lost circulation material with regard to the sealing of the vertical wall of a well bore through porous formation as well as its performance in establishing a seal upon a horizontal or bottom wall thereof can be readily ascertained.

It is of course understood that the apertures 94, 96, 106, and 108, may be of any desired size for most effectively confining the test bed 110 and for permitting effective access of the drilling fluid and the admixed loss circulation material to the adjacent surfaces of the test bed.

In some instances, the apertures 96 may be omitted whereby the cup will have an imperforate bottom wall 92, thus causing all of the fluid to pass through the sides of the test bed by the apertures 106 and 94 whereby the test will be limited to the vertical walls of the bore in the test bed.

*Embodiment of Figures 9 and 10*

A still further form of testing apparatus is disclosed in Figures 9 and 10. In this form, the cylindrical cup containing the test bed 110, has been designated generally by the numeral 120, and consists of a cylindrical side wall 122 together with an integral imperforate bottom wall 124. The side wall is provided with longitudinally extending ribs 126 which are adapted to loosely engage the interior cylindrical surface of the cylinder 54 for positioning the container 120 therein, the ribs 126 thus providing longitudinally extending channels 128 therebetween and between the side wall 122 and the sleeve or cylinder 54. The channels 128 constitute drilling fluid collecting and draining channels, which communicate with the interior or the container 120 as by suitable apertures 130, and which communicate with the interior of the draining plug 62 as by passages 132 which pass through the bottom wall 124. As in the preceding embodiment, the receptable 120 is clamped against the sealing ring or packing 66 by means of the draining nut 62 in the manner previously described.

Removably disposed within the receptacle 120 is an inner cylinder or sleeve 134 which is open at both ends, upper and lower, and at the latter is adapted to engage and rest upon the bottom wall 124, as shown in Figure 9. The inner sleeve 134 is suitably apertured as at 136.

With the inner cylinder 134 in place and disposed substantially axially of the member 120, and with its open lower end resting upon the bottom wall 124, the testing bed 110 may be placed in position. The drilling fluid with the additive admixed therewith is then supplied into the member 48, into the open upper end of the inner cylinder 134 to the extent required for the test. In some instances, the cylinder 134 may then be removed by lifting the same upwardly from the member 120, this procedure being suitable where the testing bed 110 is of sufficient rigidity to retain its shape. In any event, with the device assembled, as shown in Figure 9, and with or without the cylinder 134 positioned within the receptacle 120, fluid pressure may be applied to the interior of the member 48 and to the drilling fluid and additive disposed within the central bore within the test bed 110. Since the bottom wall 124 is imperforate, all of the leakage and flow of fluid must be laterally or horizontally through the vertical cylindrical wall of the test bed, and from the latter through the apertures 130 into the drainage channels 128 and from thence by way of passages 132 into the drainage plug 62. It will thus be apparent that in this form of the apparatus, test may be conducted to determine the sealing effect of a given additive solely as regards a porous portion of the side wall of a well bore.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In a testing device, in combination, an elongated testing tube of metal adapted to withstand high pressures and to hold a fluid whose sealing characteristics are to be determined, a plurality of standards pivoted to the tube intermediate its ends for supporting the tube in a vertical position when the standards are expanded, a cap member for closing the top end of the tube, a coupling for releasably securing the cap member to the tube to provide a liquid-tight joint, a cylinder adapted to be releasably secured to the lower end of the testing tube, a second coupling for releasably securing the cylinder to the tube to provide a liquid-tight joint, a container having a perforated bottom wall, said container being adapted for insertion within the cylinder to close the lower end of the tube, said container being adapted to receive material forming a filter bed for the fluid to be tested, a retaining plug having threaded connection with the cylinder to releasably lock the container within the cylinder, a pressure supply line in communicating relation with the upper portion of the testing tube, and means for venting the tube having location adjacent the upper portion thereof.

2. A testing device as defined by claim 1, wherein the coupling for releasably securing the cap member to the tube and the second coupling for releasably securing the cylinder to the tube each include a rotatable nut, wherein the pressure supply line and the means for venting the tube are each connected to the cap member, and wherein the container is of plastic and has a close sliding fit with the inside surfaces of the cylinder.

3. A portable apparatus for testing the sealing properties of drilling mud additives comprising a body having a pressure chamber therein, a container for receiving a testing bed of a loose, granular filtering material therein, fastening means removably securing said container to said body in pressure tight engagement and with the interior of the container in communication with the pressure chamber, means for introducing a mixture of a fluid having a drilling mud additive admixed therewith into said pressure chamber for passage through said testing bed, discharge means in said container permitting the exit of fluid passing through a testing bed in the container, means for applying pressure to said pressure chamber and upon the fluid introduced therein.

4. A portable apparatus for testing the sealing properties of drilling mud additives comprising a body having a pressure chamber therein, a container for receiving a testing bed of a loose, granular filtering material therein, fastening means removably securing said container to said body in pressure tight engagement and with the interior of the container in communication with the pressure chamber, means for introducing a mixture of a fluid having a drilling mud additive admixed therewith into said pressure chamber for passage through said testing bed, discharge means in said container permitting the exit of fluid passing through a testing bed in the container, means for applying pressure to said pressure chamber and upon the fluid introduced therein, a cap comprising a closure for said pressure chamber, means removably securing said cap to said body in pressure tight engagement, means carried by said cap and communicating with the interior of the pressure chamber for venting the pressure therein.

5. A testing apparatus comprising a body having a chamber therein for receiving a fluid having admixed therewith a sealing mud additive whose sealing characteristics are to be determined, said chamber opening to the upper and lower sides thereof, upper and lower casings secured to said upper and lower sides and having their interiors communicating with said chamber, means supporting said body and casings in a substantially vertical position, a receptacle in said lower casing having an open upper end communicating with said chamber and a perforated bottom wall, said receptacle being adapted to be filled with loose granular filtering material constituting a test bed through which said fluid is adapted to be passed, a fastener on said lower casing securing said receptacle in said lower casing, a closure cap for said upper casing, means for supplying pressure fluid to said chamber and upon the fluid therein and means for venting pressure fluid from said upper casing.

6. A testing apparatus comprising a body having a chamber therein for receiving a fluid having admixed therewith a sealing mud additive whose sealing characteristics are to be determined, said chamber opening to the upper and lower sides thereof, upper and lower casings secured to said upper and lower sides and having their interiors communicating with said chamber, means supporting said body and casings in a substantially vertical position, a receptacle in said lower casing having an open upper end communicating with said chamber and a perforated bottom wall, said receptacle being adapted to be filled with loose granular filtering material constituting a test bed through which said fluid is adapted to be passed, a fastener on said lower casing securing said receptacle in said lower casing, a closure cap for said upper casing, means for supplying pressure fluid to and means for venting pressure fluid from said upper casing, said fastener including a plug engaging said lower casing, said plug having liquid drain passages therethrough.

7. A testing apparatus comprising a body having a chamber therein for receiving a fluid having admixed therewith a sealing mud additive whose sealing characteristics are to be determined, said chamber opening to the upper and lower sides thereof, upper and lower casings secured to said upper and lower sides and having their interiors communicating with said chamber, means supporting said body and casings in a substantially vertical position, a receptacle in said lower casing having an open upper end communicating with said chamber and a perforated bottom wall, said receptacle being adapted to be filled with loose granular filtering material constituting a test bed through which said fluid is adapted to be passed, a fastener on said lower casing securing said receptacle in said lower casing, a closure cap for said upper casing, means for supplying pressure fluid to and means for venting pressure fluid from said upper casing, a retainer securing said body to one of said casings, said support means being attached to said retainer.

8. An apparatus for testing the sealing properties of drilling mud additives comprising a body having a pressure chamber therein, means for introducing therein a sample of drilling mud having an additive mixed therewith, a receptacle having a chamber adapted to receive a test bed of granular filtering material simulating a porous subterranean formation, said receptacle being positioned adjacent and communicating with said pressure chamber, means supplying pressure to said pressure chamber to thereby apply pressure to the drilling mud sample and press the latter against a surface of the test bed, said receptacle having an opening for discharging from another surface of said test bed any portion of said sample passing through the granular material.

9. The combination of claim 8 wherein said introducing means comprises a removable closure for said pressure chamber, said pressure supplying means including a conduit connected to said closure and communicating with said pressure chamber through said closure.

10. The combination of claim 8 wherein said receptacle is open at one end and carried by said body, a container in said receptacle adapted to receive said test bed, means mounted in the open end of said receptacle for retaining said container and closing said open end, said receptacle and container having communication with said pressure chamber.

11. An apparatus for testing and measuring the sealing properties of drilling mud additives under pressures ranging up to and above 2000 p. s. i. comprising a hollow body having a pressure chamber therein, a receptacle, a test bed of granular material simulating a porous subterranean formation disposed in said receptacle, means placing said receptacle and one surface of the test bed therein in communication with said pressure chamber, means for introducing a sample of drilling mud having an additive admixed therewith into said pressure chamber, means supplying predetermined and controlled pressure ranging up to 2000 p. s. i. to the pressure chamber to thereby apply pressure to the drilling mud sample and press the latter against a surface of the test bed, means for discharging from another surface of the test bed any portion of the mud passing through the granular material.

12. The combination of claim 11 wherein said receptacle has a chamber therein with openings through opposite ends of said receptacle, said receptacle having one opening constituting part of said means for placing said receptacle in communication with said pressure chamber, a container slidable through the opposite opening and receiving said test bed, said discharging means being disposed in said opposite opening.

13. The combination of claim 11 wherein said receptacle has a chamber therein with openings through opposite ends of said receptacle, said receptacle having one opening constituting part of said means for placing said receptacle in communication with said pressure chamber, a container slidable through the opposite opening and receiving said test bed, said discharging means being disposed in said opposite opening, and retaining said container in said receptacle.

14. The combination of claim 13 wherein said discharging means retains the upper container in seating and sealing engagement with said body.

References Cited in the file of this patent

UNITED STATES PATENTS

| Number | Name | Date |
|---|---|---|
| 601,300 | Hoff | Mar. 29, 1898 |
| 710,405 | Bartliff | Oct. 7, 1902 |
| 966,078 | Bowman | Aug. 2, 1910 |
| 2,110,318 | Baruch | Mar. 8, 1938 |
| 2,187,514 | Gardner | Jan. 16, 1940 |
| 2,244,574 | Rogers | June 3, 1941 |
| 2,346,945 | Samson et al. | Apr. 18, 1944 |
| 2,381,627 | Thompson | Aug. 7, 1945 |
| 2,484,507 | Hertel | Oct. 11, 1949 |
| 2,630,227 | Rodwell | Mar. 3, 1953 |
| 2,646,678 | Standing et al. | July 28, 1953 |
| 2,660,315 | Lasky | Nov. 24, 1953 |